United States Patent
Tavares et al.

(10) Patent No.: US 10,570,244 B2
(45) Date of Patent: Feb. 25, 2020

(54) CROSS-LINKED THERMOPLASTIC CO-POLYESTER ELASTOMER, METHOD OF MAKING SAME, AND ARTICLES COMPOSED THEREOF

(75) Inventors: Manuel Tavares, Doylestown, PA (US); Michael J. Schmidt, Norristown, PA (US)

(73) Assignee: Pennsy Corporation, West Chester, PA (US)

( * ) Notice: Subject to any disclaimer, the term of this patent is extended or adjusted under 35 U.S.C. 154(b) by 406 days.

(21) Appl. No.: 13/570,917

(22) Filed: Aug. 9, 2012

(65) Prior Publication Data

US 2014/0046002 A1    Feb. 13, 2014

(51) Int. Cl.
| | |
|---|---|
| C08G 18/10 | (2006.01) |
| C08G 18/66 | (2006.01) |
| C08G 18/76 | (2006.01) |
| C08G 18/32 | (2006.01) |
| C08G 18/42 | (2006.01) |
| C08G 18/38 | (2006.01) |

(52) U.S. Cl.
CPC ....... *C08G 18/6648* (2013.01); *C08G 18/324* (2013.01); *C08G 18/3814* (2013.01); *C08G 18/4211* (2013.01); *C08G 18/7671* (2013.01)

(58) Field of Classification Search
CPC .... C08G 18/10; C08G 18/12; C08G 18/3225; C08G 18/42
USPC ........................ 525/440.01, 440.06, 453, 459
See application file for complete search history.

(56) References Cited

U.S. PATENT DOCUMENTS

| | | | |
|---|---|---|---|
| 3,642,964 A | | 2/1972 | Rausch |
| 3,823,833 A | * | 7/1974 | Chung ........................ 213/40 R |
| 3,845,021 A | | 10/1974 | Dukes et al. |
| 4,605,729 A | * | 8/1986 | Barnes et al. ................ 528/301 |
| 5,028,685 A | | 7/1991 | Ho et al. |
| 5,342,867 A | * | 8/1994 | Ryan et al. ................... 524/101 |
| 6,855,076 B2 | | 2/2005 | Matroni et al. |
| 6,939,924 B2 | | 9/2005 | Kim et al. |
| 7,417,094 B2 | | 8/2008 | Dewanjee et al. |
| 7,540,990 B1 | | 6/2009 | Dewanjee et al. |
| 7,785,522 B2 | | 8/2010 | Dewanjee et al. |
| 8,003,747 B2 | | 8/2011 | Dewanjee et al. |
| 2002/0039935 A1 | | 4/2002 | Dewanjee |
| 2003/0065124 A1 | | 4/2003 | Rosenberg et al. |
| 2006/0267261 A1 | * | 11/2006 | Koenen et al. ................ 267/166 |
| 2007/0155895 A1 | | 7/2007 | Rukavina et al. |
| 2010/0064930 A1 | * | 3/2010 | Schorr et al. .............. 105/224.1 |

OTHER PUBLICATIONS

Prisacariu, C., et al.; Proceedings of the World Congress on Engineering, 2011, vol. III, p. 1-6.*
Shin Etsu; Silicones for Resin Modification, 2010, p. 1-5.*
Kear, K.E.; Developments in Thermoplastic Elastomers, 2003, p. 13.*

* cited by examiner

*Primary Examiner* — Robert S Jones
(74) *Attorney, Agent, or Firm* — Bonini IP Law, LLC; Frank J. Bonini, Jr.

(57) ABSTRACT

A process for forming a cross-linked thermoplastic elastomer is disclosed herein. The cross-linked thermoplastic elastomer is a thermoplastic cross-linked copolyester and is preferably formed by heating a first mixture containing a thermoplastic elastomeric base material, a monomeric diisocyanate comprising between 1 to 10% of the total weight of the first mixture, and a second mixture of a first diamine and a second diamine comprising between 1 to 10% of the total weight of a total reaction product. The heated first mixture, which is flowable, is injected into at least one injection molding device, with the second mixture injected at predetermined intervals to create a homogeneous reaction product. The reaction product may be injected into a mold to produce articles.

19 Claims, 3 Drawing Sheets

CROSS-LINKED THERMOPLASTIC CO-POLYESTER ELASTOMER, METHOD OF MAKING SAME, AND ARTICLES COMPOSED THEREOF

BACKGROUND OF THE INVENTION

1. Field of the Invention

The field of the invention generally relates to thermoplastic co-polyesters having improved properties mechanical and thermal properties. The field of the invention also includes methods of making the same and improved products, in particular, improved railroad products, constructed from the improved thermoplastic co-polyesters.

2. Description of the Related Art

There currently are a number of commercialized products made from co-polyesters. Co-polyester is the term applied to those polyesters whose synthesis uses more than one glycol and/or more than one dibasic acid. Thermoplastic co-polyesters generally have linear molecular structures and are able to flow freely at elevated temperatures. For this reason, thermoplastic co-polyesters are preferred for products which are produced by injection molding or other extrusion techniques, where flowability of the reactants is of paramount importance. Unfortunately, thermoplastic co-polyesters typically exhibit poor performance characteristics with respect to abrasion, tensile strength, rebound, compression set and thermal properties.

In contrast to current thermoplastic co-polyesters, thermoset urethanes have particularly good characteristics with respect to abrasion, tensile strength, rebound, compression set and thermal properties. Thermoset urethanes generally have a network structure that incorporates irreversible chemical cross-linking. The downside of thermoset urethane is that the irreversible chemical cross-linking reaction makes it unsuitable for use in injection molding and extrusion applications. Typically, thermoset urethanes are formed using a casting process. Unfortunately, casting processes require costly equipment, usually involve a large number of processing steps and are difficult to use. Casting is thus a less efficient and more expensive method of producing products as compared to injection molding and extrusion systems.

With respect to thermoplastic co-polyesters, a dial or polyol is reacted with a dimethyl terephthalate. This reaction typically takes place in large commercial reactors. As stated above, thermoplastic co-polyester, while not cross-linked, is usable in injection molding and other extrusion methods. Because of the lack of cross-linking, these materials have abrasion, tensile, and compression set properties that are not as good as thermoset polyurethane. One solution has been to use a costly thermoset urethane, which for larger products, adds to their production cost, while another has been just to accept the lesser properties that are provided by the use of a thermoset co-polyester. There also has been proposed the use of a cross-linked thermoplastic polyurethane and polyurea in U.S. Pat. No. 8,003,747.

In railroad applications thermoplastic materials may be used to construct railroad components, such as, for example, springs for draft gears, constant contact side springs, primary suspension components, bumpers, track tie pads and steering pads for bearing adapters. Injection molding or extrusion of products involves the utilization of mold components, and involves a residence time that the molding material remains in the mold or mold components. A need exists for a material that may be utilized in extrusion or injection molding processes to form articles which also reduce the amount of residence time required, making the mold components available for further use, at a sooner time interval. A need also exists for railroad components that may be produced having improved heat resistance, increased compression set or strength, improved resistance to creep, and improved rebound when used for spring, steering pad or track pad components.

There thus is a need for a thermoplastic co-polyester material which exhibits good abrasion, rebound, thermal properties and compression set characteristics which are similar to those found in thermoset urethanes. There is a need for a material that enables the articles to be produced using conventional injection molding and/or extrusion techniques, where the articles produced also are durable and lasting when in use.

BRIEF SUMMARY OF THE INVENTION

The present invention provides a solution for forming cross-linked thermoplastic elastomers, which, according to a most preferred embodiment, provides a cross-linked copolyester. A preferred embodiment of the invention involves adding a cross-linking agent to a thermoplastic resin in the pre-injection molding stage. In order to prevent the cross-linking agent from flashing-off, a second component, which according to preferred embodiments may be a second mixture, is added during the injection molding stage. This second mixture prevents the flashing off of the cross-linking agent while allowing for processing without a build-up of material.

One aspect of the present invention is a method for forming an article composed of a cross-linked thermoplastic co-polyester polymer. According to one preferred embodiment, the method includes mixing a thermoplastic co-polyester based material and a monomeric diisocyanate to create a first mixture. According to a preferred embodiment, the monomeric diisocyanate comprises between 1% to 10% of the total mass of the first mixture. According to preferred embodiments, the method also includes mixing diamines, such as, for example, 4,4'methylene-bis-(3-chloro-2,6-diethylaniline) and diethyl 2,4-toluenediamine to create a second mixture. The 4,4'methylene-bis-(3-chloro-2,6-diethylaniline) is 75% to 95% of the total mass of the second mixture and diethyl 2,4-toluenediamine is 25% to 5% of the total mass of the second mixture. A preferred embodiment of the method also includes heating the first mixture to a temperature within the range of 200 .degree. F. to 450 .degree. F. to create a heated first mixture. A preferred embodiment of the method also includes heating the second mixture to a temperature greater than the melting point of the second mixture and less than 225 .degree. F. to create a liquid second mixture having a volume. According to preferred embodiments, the first mixture and second mixture are introduced to each other. According to one embodiment, the method, includes injecting the heated first mixture into a barrel of an injection molding machine through a first opening. Preferred embodiments of the invention also involve providing the liquid second mixture. According to one embodiment, the method includes injecting the liquid second mixture into the barrel of the injection molding machine in a plurality of dispensing shots of approximately equal amounts of the volume of the liquid second mixture during a predetermined time period.

According to some embodiments, the method may involve injecting a reaction product into at least one injection mold cavity, the reaction product formed by the reaction of the heated first mixture and the liquid second mixture.

According to preferred embodiments, the method includes forming an article composed of the reaction product.

According to preferred embodiments, railroad articles are produced from the cross-linked copolymer reaction product, including, for example, articles such as springs for draft gears, constant contact side springs, primary suspension components, bumpers, as well as for products like railway tie pads and steering pads for bearing adapters. The railroad articles may be produced by the aforementioned methods, including where the liquid second mixture is injected into the barrel of the injection molding machine in a plurality of dispensing shots, or where the reaction product of the first mixture and second mixture are supplied to a mold cavity.

It is a further object of the present invention to produce articles that have improved resistance to deformation when subjected to prolonged tension or compression loading at operating temperatures, such as, for example, railroad articles used in the operation of a railway or railway vehicle.

It is a further object of the present invention to produce articles that have improved rebound, and, in particular, spring components used in railway operations, such as, for example, on railway vehicles.

It is a further object of the present invention to produce articles that have improved resistance to heat and improved compression strength, such as, for example, railroad articles used in the operation of a railway or railway vehicle.

It is a further object of the present invention to facilitate production efficiencies by providing a material and method that reduces residence time that the molding material remains in the mold or mold components during an injection molding or extrusion process. Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
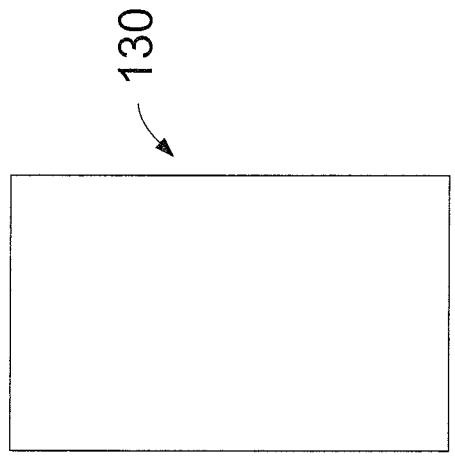
FIG. 1 is an illustration of a railroad steering pad constructed from the cross-linked thermoplastic co-polyester.

According to a preferred embodiment of the invention, a method for forming a cross-linked thermoplastic co-polyester is provided that involves four different components. The first component is a thermoplastic co-polyester resin material. The second component is a diisocyanate. The third component is a diamine. The fourth component is a diamine. According to an alternate embodiment, three components are provided, including a first component which is a thermoplastic co-polyester resin material, a second component which is a diisocyanate, and a third component which is a diamine. Embodiments of the invention are discussed below.

According to another preferred embodiment, three components are provided to form the cross-linked thermoplastic co-polymer, including a thermoplastic co-polyester resin material, a diisocyanate and a diamine. The diamine preferably is a diamine that may be provided in the form of one or more of the following compounds: 4,4' methylene-bis-(3-chloro-2,6-diethylaniline), 4,4' methylene-bis-(2,6-diethylaniline), 4,4'-methylenebis(2-isopropyl-6-methylaniline), 4,4'-methylenebis(2,6-diisopropylaniline), Dimethyl Thio-Toluene Diamine or 4,4'-Methylenebis(N-sec-butylaniline). According to one embodiment, the diamine is provided as a solid compound. According to another embodiment, the diamine is provided as a liquid compound. Preferably, according to embodiments where the diamine is provided as a solid compound, the diamine may comprise: 4,4' methylene-bis-(3-chloro-2,6-diethylaniline), 4,4' methylene-bis-(2,6-diethylaniline), 4,4'-methylenebis(2-isopropyl-6-methylaniline), or 4,4'-methylenebis(2,6-diisopropylaniline). Preferably, according to embodiments where the diamine is provided as a liquid compound, the diamine may comprise: Dimethyl Thio-Toluene Diamine or 4,4'-Methylenebis(N-sec-butylaniline). Alternately, the liquid diamine may be provided by heating a diamine that is not a liquid at room temperature, to provide a liquid diamine. Alternate embodiments of a method for forming a cross-linked thermoplastic co-polyester are provided that utilize more than one diamine and/or mixtures of diamines. Some embodiments utilize a first diamine and a second diamine to produce a cross-linked thermoplastic co-polyester. Articles are preferably produced using the mixtures, and more preferably may be produced using injection molding techniques.

According to one embodiment, a mixture of a thermoplastic co-polyester resin material, a diisocyanate and a diamine are provided to form a cross-linked thermoplastic co-polyester. The mixture may be introduced into an injection molding machine and used to produce articles through an injection molding process, including injection of the mixture into a mold cavity. According to another embodiment, the injection may include introducing the diamine to the thermoplastic co-polyester resin material and a diisocyanate, while another embodiment involves mixing the components together and providing the mixture in the injection barrel of a molding machine. According to another preferred embodiment, the diamine includes a liquid and solid diamine, and the solid diamine may be mixed with the thermoplastic co-polyester resin material and diisocyanate, while the liquid diamine may be introduced to the thermoplastic co-polyester resin material, diisocyanate, solid diamine mixture.

According to one preferred embodiment, the thermoplastic co-polyester resin material and the diisocyanate are preferably mixed in a dry state to create a first dry mixture. The third and fourth components, the diamines, are mixed together to create a liquid second mixture. The dry mixture is heated into a flowable form and the liquid second mixture is introduced at predetermined intervals of equal amounts to create a homogeneous reaction product.

The thermoplastic co-polyester base materials are not limited to, and may include, co-polyester materials under the trademarks HYTRL®, ARNITEL®, SKYPEL®, and KEYFLEX®.

The thermoplastic co-polyester base material is preferably dried prior to adding the additional components described in detail below. This can be accomplished, for example, by heating the thermoplastic base material to a temperature between about 100 .degree. F, to 200 .degree. F. in a separate container.

A monomeric diisocyanate is added to the dried thermoplastic co-polyester base material. Preferably, the diisocyanate used in the process is a solid at room temperature. In one preferred aspect of the invention, the diisocyanate is 4,4' diphenylmethane diisocyanate, which has a sublimation point of approximately 392 .degree. F. This can be commercially obtained from Bayer Corporation under the trade name, MONDUR M (CAS No. 101-68-8). Preferably, the flaked or fused form of MONDUR M is used in connection with the process described herein. The diisocyanate is preferably stored at about −20 .degree. C. By adding diisocyanate to the thermoplastic co-polyester base material, isocyanate functionality is added to the system. Other Diisocyanate materials which are solid at room temperature and may be used in accordance with the invention include: Toluene Diisocyanates (TDI), Toluene ortho Diisocyanates (TODI), Naphthalene Diisocyanates (NDI), Hydrogenated Methylene Diisocyanates (H12MDI), Iso Phorone Diisocyanates (IPDI), Hexamethylene Diisocyanates (HDI), 1,4 Phenylene Diisocyanates (PPDI). These isocyanate-based compounds can be made in solid crystalline form suitable for dry blending. These isocyanates can also be added in the liquid and semi-liquid form.

Preferably, the diisocyanate comprises between 1% to 10% of the total weight of the mixture forming the cross-linked thermoplastic co-polyester. Even more preferably, the diisocyanate comprises between 1% to 3% of the total weight of the mixture forming the cross-linked thermoplastic co-polyester. The diisocyanate materials other than those specifically identified above may also be used in accordance with the invention, provided they exist as a solid at room temperature.

One preferred diamine is 4,4' methylene-bis-(3-chloro-2,6-diethylaniline), available commercially as LONZACURE M-CDEA (CAS No. 106246-33-7). Another diamine which may be employed with the present invention is 4,4' Methylene-bis-(2,6-diethylaniline), available commercially as LONZACURE M-DEA (CAS No. 13680-35-8). Both diamines have melting points at approximately 90 .degree. C. Preferably, the diamine is added in solid form and dry blended with the MDI and thermoplastic urethane base material. Alternative cross-linking agents and other solid or crystalline Diamines which may be used in the present invention include: 4,4'-METHYLENEBIS(2-ISOPROPYL-6-METHYLANILINE) commercially as Lonzacure M-MIPA, 4,4'-METHYLENEBIS(2,6-DIISOPROPYLANILINE) commercially as Lonzacure M-DIPA, MOCA (4,4'-Methylenebis-(O-Chloroaniline)), MDA (Methylene Dianiline), as well as any other methylene bis aniline like LONZACURE M-CDEA described above. Any other diamine-based compounds can be made in solid crystalline form suitable for dry blending can also be used. The diamines above can also be added in the liquid or semi-liquid form.

A second diamine for the second mixture is preferably diethyl 2,4-toluenediamine, which is available under the tradename ETHACURE 100, or E100, from Albermarle of Baton Rouge, La. The diethyl toluene diamine prevents build-up due to the first diamine, preferably 4,4'methylene-bis-(3-chloro-2,6-diethylaniline). The second mixture is preferably 75 to 95 parts by weight 4,4'methylene-bis-(3-chloro-2,6-diethylaniline) and 5 to 25 parts by weight diethyl 2,4-toluenediamine, and more preferably 80 to 90 parts by weight 4,4'methylene-bis-(3-chloro-2,6-diethylaniline) and 10 to 20 parts by weight diethyl 2,4-toluenediamine, and most preferably 85 parts by weight 4,4'methylene-bis-(3-chloro-2,6-diethylaniline) and 15 parts by weight diethyl 2,4-toluenediamine.

Alternative second cross-linking agents and other Ethacure E100 which may be used are Ethacure E300 (Dimethyl Thio-Toluene Diamine), Ethacure E420 (4,4'-Methylenebis(N-sec-butylaniline)) and other such liquid amines with preferably boiling points above 392 degrees F.

The second mixture is preferably utilized to prevent the diisocyanate from "flashing off" during the processing. The second mixture provides heat stability to the diisocyanate during the processing. The second mixture also allows the temperature of the reaction to be reduced substantially which provides for a more favorable viscosity. Further, the use of 4,4'methylene-bis-(3-chloro-2,6-diethylaniline) allows for the diisocyanate to be utilized at a higher temperature since the 4,4'methylene-bis-(3-chloro-2,6-diethylaniline) essentially increasing the boiling temperature of the diisocyanate.

Preferably, the diamines comprises between 1% to 10% of the total weight of the mixture forming the cross-linked thermoplastic. Even more preferably, diamine comprises between 1% to 2% of the total weight of the mixture forming the cross-linked thermoplastic. Diamines other than those specifically identified above may also be used in accordance with the invention, provided they exist as a solid at a temperature within the range of 50 .degree. F. to 150 .degree. F.

The injection molded co-polyester may be used to form any number of products including, for example, skateboard wheels, in-line skate wheels, roller coaster wheels, caster wheels, golf ball layers, and golf club components, and the like. Products in the automotive industry such as seals, O-rings, gaskets, bushings, CV joint cover, and tires may also be made using the methods described herein. The materials and methods can also be used in footwear applications such as, for example, shoe soles and the like. The materials can also be used in the railroad applications such as springs for draft gears, constant contact side springs, primary suspension, bumpers, as well as for products like railway tie pads.

According to a preferred embodiment, the method of the present invention involves mixing the thermoplastic co-polyester resin and a diisocyanate to create a first mixture. The monomeric diisocyanate comprises between 1% to 10% of the total mass of the first mixture, and most preferably 6% by weight of the first mixture. According to preferred embodiments, the first mixture is mixed in or introduced to a molding apparatus, such as, for example, a barrel or a first chamber thereof. Preferably the diisocyanate is MONDUR flakes. Then the 4,4'methylene-bis-(3-chloro-2,6-diethylaniline) and diethyl 2,4-toluenediamine are mixed to create a second mixture. The second mixture is preferably mixed in a mixing chamber, such as, for example, a secondary mixing chamber of an injection molding apparatus. The 4,4'methylene-bis-(3-chloro-2,6-diethylaniline) is preferably 75 to 95% of the total mass of the second mixture and diethyl 2,4-toluenediamine is 25% to 5% of the total mass of the second mixture. The first mixture is heated to create a first heated mixture. The first mixture is heated to a temperature preferably within the range of 200 .degree. F. to 450 .degree. F. to create a heated first mixture. The second mixture is heated to create a liquid second mixture. The liquid second mixture is preferably created in the secondary mixing chamber. The second mixture is preferably heated to a temperature greater than the melting point of the second mixture and less than 225 .degree. F. to create a liquid second mixture having a predetermined volume. Then the heated first mixture is injected into a barrel through an opening at one end of the barrel. The liquid second mixture is injected into the barrel at predetermined intervals and in predetermined amounts. In a preferred embodiment, the liquid second mixture is injected into the barrel four times in four equal amounts of the volume of the liquid second mixture in order to create a homogeneous reaction product. Each of the four injections of the liquid second mixture is preferably 1 to 20 grams of the liquid second mixture. Then reaction product is injected into a mold cavity, preferably a cavity of a mold creating an article that is formed from the reaction product within the mold. The article is preferably an article such as discussed above. The article is then post cured 6 to 36 hrs depending on wall thickness and size of the article.

According to another embodiment, a second preferred method for forming a cross-linked thermoplastic co-polyester involves three of the components described above. The first component is a thermoplastic co-polyester resin material. The second component is a diisocyanate. The third component is a diamine.

According to a second preferred method of the present invention, the thermoplastic co-polyester resin and a diisocyanate are mixed to create a first mixture. The monomeric diisocyanate comprises between 1% to 10% of the total mass of the first mixture, and most preferably 6% by weight of the first mixture. Preferably the diisocyanate is MONDUR flakes. The first mixture is heated to a temperature preferably within the range of 200 .degree. F. to 450 .degree. F. to create a heated first mixture. Then a diamine selected from those listed above but preferably, 4,4'methylene-bis-(3-chloro-2, 6-diethylaniline) or diethyl 2,4-toluenediamine, and most preferably diethyl 2,4-toluenediamine, is heated to create a liquid, or warmed, preferably below 225 .degree F., if it is already a liquid, to allow it to suitably mix with the first heated mixture. According to one embodiment, the heated first mixture is then injected into a barrel through an opening at one end of the barrel, and the liquid diamine is injected into the barrel at predetermined intervals and in predetermined amounts. In accordance with one preferred embodiment, the liquid diamine is injected into the barrel four times in four equal amounts of the volume of the liquid second mixture in order to create a homogeneous reaction product. Each of the four injections of the liquid diamine is preferably 1 to 20 grams of the liquid diamine. Then the reaction product is injected into a mold cavity, preferably a cavity of a mold creating an article that is formed from the reaction product within the mold. The article is preferably an article such as discussed above or shown or described herein. The article is then post cured 6 to 36 hrs depending on wall thickness and size of the article.

According to another embodiment, a third preferred method for forming a cross-linked thermoplastic co-polyester may be carried out involving the use of the same four components described above, but, in addition, also includes a fifth component. The first component is a thermoplastic co-polyester resin material. The second component is a diisocyanate. The third component is a diamine. The fourth component is a diamine. The fifth component is an adhesion promoter; preferably a silane adhesion promoter.

The third preferred method, according to this alternate embodiment of the present invention, involves the application of an adhesion promoter which, preferably may be applied by coating it on the thermoplastic co-polyester resin. One preferred coating method is accomplished by dispersing the adhesion promoter in a solvent carrier that will not affect the base resin forming a mixture. One example of a solvent carrier is water. Preferably the adhesion promoter is added at 0.1 to 6% by weight of the base resin. Then the base resin is added to the adhesion promoter solvent mixture and mixed. Then the base resin needs to be dried at a temperature that will remove the solvent carrier but not degrade the base resin. This drying may be done under vacuum to speed up the process and lower the evaporation temperature. Another way of coating the base resin with the adhesion promoter is by spraying the adhesion promoter onto the particles as they are being tumbled or dispersed to allow for equal dispersion. The spray dispersion method is well known to those familiar with silane applications, coating and dispersion. Once the base resin is coated with the adhesion promoter and dried then the same above described steps may be performed. The thermoplastic co-polyester resin coated with adhesion promoter and a diisocyanate are mixed to create a second mixture. The monomeric diisocyanate comprises between 1% to 10% of the total mass of the first mixture, and most preferably 6% by weight of the first mixture. Preferably the diisocyanate is MONDUR flakes. Then the 4,4'methylene-bis-(3-chloro-2,6-diethylaniline) and diethyl 2,4-toluenediamine are mixed to create a third mixture. The third mixture is preferably mixed in the secondary mixing chamber. The 4,4'methylene-bis-(3-chloro-2,6-diethylaniline) is preferably 75% to 95% of the total mass of the third mixture and diethyl 2,4-toluenediamine is 25% to 5% of the total mass of the third mixture. The second mixture is heated to create a second heated mixture. The second mixture is heated to a temperature preferably within the range of 200 .degree. F. to 450 .degree. F. to create a heated second mixture. The third mixture is heated to create a liquid third mixture. The liquid third mixture is preferably created in the secondary mixing chamber. The third mixture is preferably heated to a temperature greater than the melting point of the third mixture and less than 225 .degree. F. to create a liquid second mixture having a predetermined volume. Then the heated second mixture is injected into a barrel through an opening at one end of the barrel. The liquid third mixture is injected into the barrel at predetermined intervals and in predetermined amounts. In a preferred embodiment, the liquid third mixture is injected into the barrel four times in four equal amounts of the volume of the liquid third mixture in order to create a homogeneous reaction product. Each of the four injections of the liquid third mixture is preferably 1 to 20 grams of the liquid third mixture. Then reaction product is injected into a mold cavity, preferably a cavity of a mold creating an article that is formed from the reaction product within the mold. The article is preferably an article such as discussed above. The article is then post cured 6 to 36 hrs depending on wall thickness and size of the article.

According to another alternate embodiment, a fourth preferred method for forming a cross-linked thermoplastic co-polyester is provided, and involves a combination of the above components described above. The first component is a thermoplastic co-polyester resin material. The second component is a diisocyanate. The third component is a diamine. The fourth component is an adhesion promoter; preferably a silane adhesion promoter.

The fourth preferred method embodiment involves coating the adhesion promoter on the thermoplastic co-polyester resin. This may be done by dispersing the adhesion promoter in a solvent carrier that will not affect the base resin forming a mixture, one example of a solvent carrier is water. Then the base resin is added to the adhesion promoter solvent mixture and mixed. Then the base resin needs to be dried at a temperature that will remove the solvent carrier but not degrade the base resin. This drying may be done under vacuum to speed up the process and lower the evaporation temperature. Another way of coating the base resin with the adhesion promoter is by spraying the adhesion promoter onto the particles as they are being tumbled or dispersed to allow for equal dispersion. The spray dispersion method is well known to those familiar with silane applications, coating and dispersion. Once the base resin is coated with the adhesion promoter and dried then the same above described steps are performed. The thermoplastic co-polyester resin coated with adhesion promoter and a diisocyanate are mixed to create a second mixture. The monomeric diisocyanate comprises between 1% to 10% of the total mass of the first mixture, and most preferably 6% by weight of the first mixture. Preferably the diisocyanate is MONDUR flakes. The second mixture is heated to a temperature preferably within the range of 200 .degree. F. to 450 .degree. F. to create a heated first mixture. Then a diamine selected from those listed above but preferably, 4,4-methylene-bis-(3-chloro-2,6-diethylaniline) or diethyl 2,4-toluenediamine, preferably diethyl 2,4-toluenediamine, is heated to create a liquid, or warmed, preferably below 225 .degree F., if it is already a liquid to allow it to mix properly with the first heated mixture. Then the heated second mixture is injected into a barrel through an opening at one end of the barrel. The liquid diamine is injected into the barrel at predetermined intervals and in predetermined amounts. In a preferred embodiment, the liquid diamine is injected into the barrel four times in four equal amounts of the volume of the diamine in order to create a homogeneous reaction product. Each of the four injections of the liquid diamine is preferably 1 to 20 grams of the liquid diamine. Then reaction product is injected into a mold cavity, preferably a cavity of a mold creating an article that is formed from the reaction product within the mold. The article is preferably an article such as discussed above. The article is then post cured 6 to 36 hrs depending on wall thickness and size of the article.

In the third and fourth preferred embodiments discussed above that involve the use of an adhesion promoter, according to preferred embodiments, the adhesion promoter may preferably be a silane. Silane adhesion promoters are sold under the tradename Silquest sold by Momentive, or they are also sold by Dow Corning and Gelest as well as numerous other companies. A few of the preferred silane adhesion promoters are Silquest A-1100 (Aminopropyltriethoxysilane), Silquest A-187 (Beta-(3,4-Epoxycyclohexyl)ethyltrimethoxysilane), Silquest A-186 (Gamma-Glycidoxypropyltrimethoxysilane. Preferably the adhesion promoter is added at 0.1 to 6% by weight of the base resin and more preferably at 1.0 to 4% by weight of the base resin.

Figure 3:
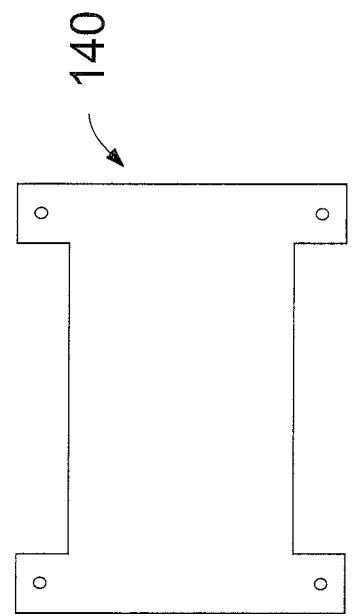
FIG. 3 is a top plan view of a second embodiment of a railroad wear plate pad constructed from the cross-linked thermoplastic co-polyester.
Figure 2:
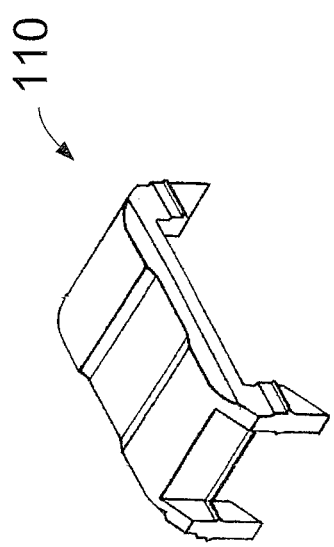
FIG. 2 is a perspective view of a first embodiment of a railroad wear plate pad constructed from the cross-linked thermoplastic co-polyester.
Figure 4:
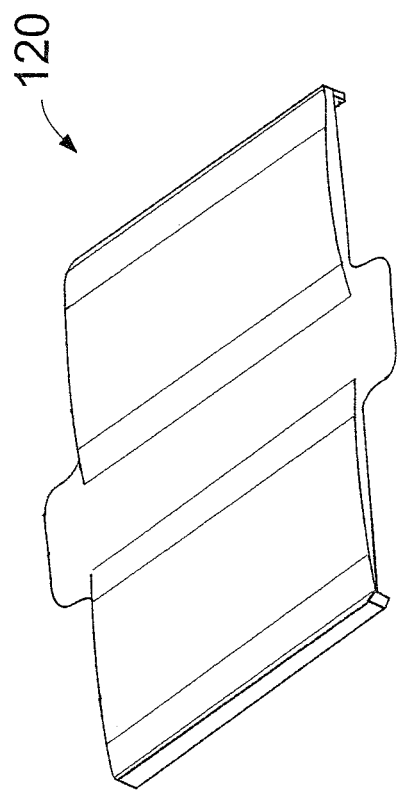
FIG. 4 is a perspective view of a track tie pad constructed from the cross-linked thermoplastic co-polyester.
Figure 8:
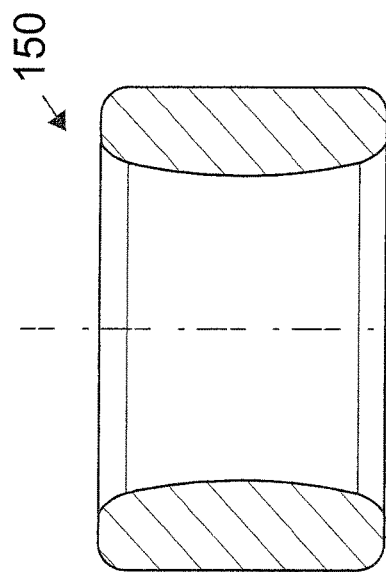
FIG. 8 is a view in cross-section of the spring of FIG. 5 in an unloaded condition.
Figure 5:
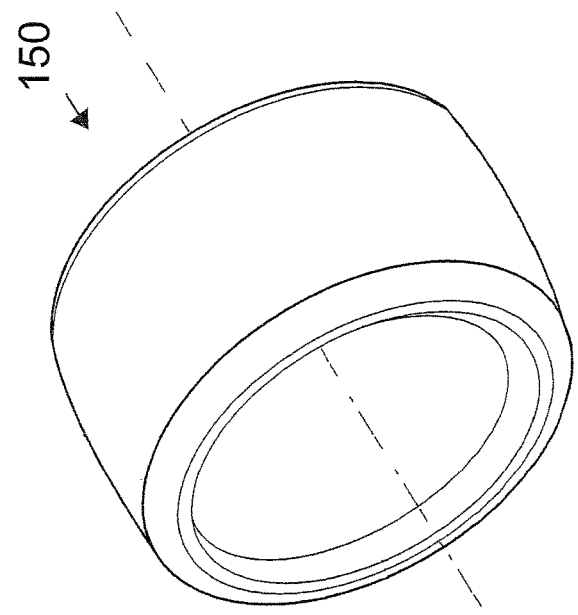
FIG. 5 is a view in perspective of a spring constructed from the cross-linked thermoplastic co-polyester.
Figure 6:
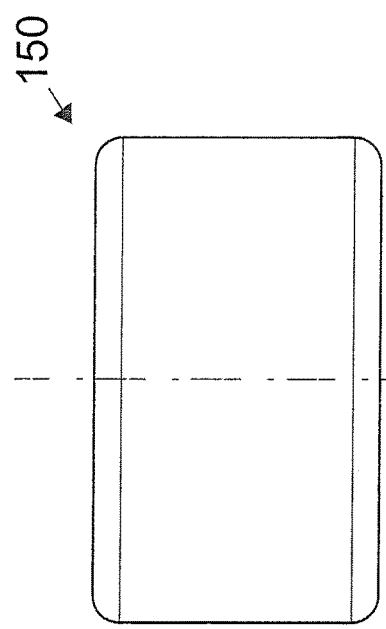
FIG. 6 is a view in front elevation of the spring of FIG. 5.
Figure 7:
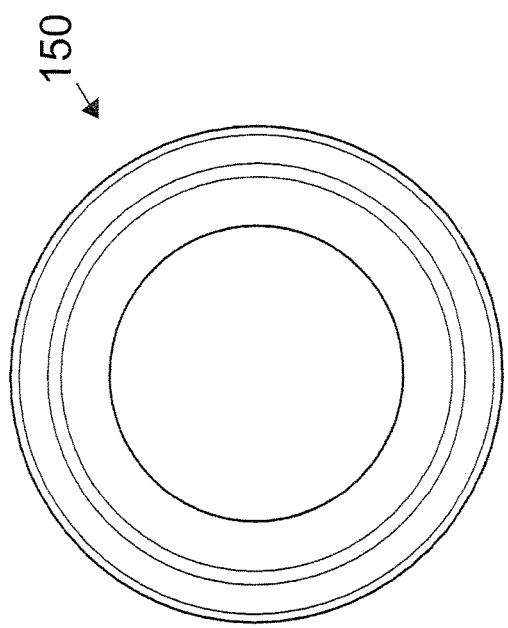
FIG. 7 is a top plan view of the spring of FIG. 5.
Figure 10:
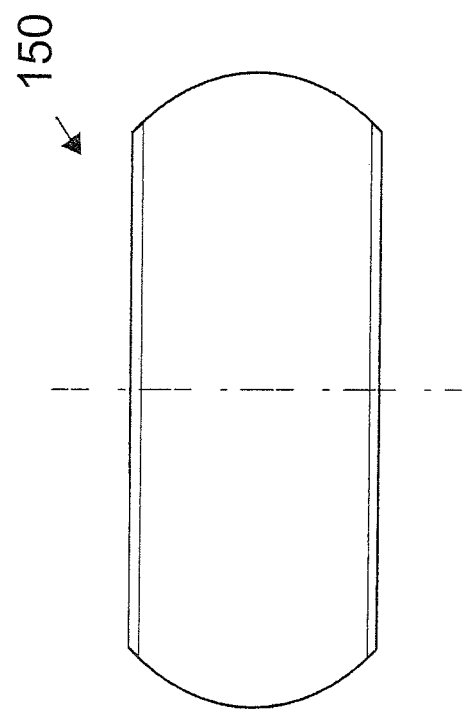
FIG. 10 is a view in cross-section of the spring of FIGS. 5 to 8 in a loaded condition.
Figure 9:
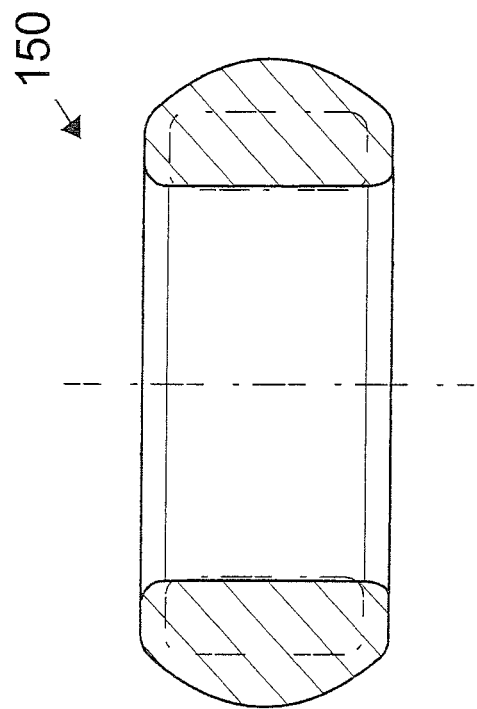
FIG. 9 is a view in front elevation of the spring of FIGS. 5 to 8 in a loaded condition.

As discussed herein, the methods disclosed herein may be used to produce articles, including, for example, by extrusion or injection molding processes. According to a preferred application of the methods disclosed herein, railroad parts are produced. Some examples of railroad parts are shown in FIGS. 1-10. FIG. 1 shows an exemplary embodiment of a railroad steering pad 110 that is constructed from the cross-linked thermoplastic co-polyester, and may be made by an injection molding process or extrusion process, including by any of the processes disclosed herein. The steering pad 110 may be used in conjunction with a railroad bearing adapter, as shown and described in U.S. Pat. No. 5,562,045, issued on Oct. 8, 1996 to John W. Rudibaugh and assigned to Pennsy Corporation, the complete disclosure of which is herein incorporated by reference. FIG. 2 shows an example of a resilient pad 120 for a pedestal wear plate constructed from the cross-linked thermoplastic co-polyester. The pad 120 is an example of a pad that may be used with a wear plate (not shown), FIG. 3 is a top plan view of another embodiment of a resilient pad 130 constructed from the cross-linked thermoplastic co-polyester. Further examples of wear plate pads that may be constructed using the methods disclosed herein are shown and described in our co-pending U.S. application Ser. No. 12/931,069, filed on Jan. 24, 2011, the complete disclosure of which is herein incorporated by reference. FIG. 4 is a perspective view of a track tie pad 140 constructed from the cross-linked thermoplastic co-polyester. The track tie pad 140 may be used to support railroad ties, and may be used with an abrasion plate (not shown). The methods disclosed herein may also be used to construct springs for use in railway cars and applications. An example of a spring 150 is shown in FIGS. 5-10. FIGS. 5-7 show a spring 150 constructed from the cross-linked thermoplastic co-polyester, with FIGS. 9-10 showing the spring 150 in a compressed loaded condition. Further examples of springs that may be constructed using the methods disclosed herein are shown and described in our co-pending U.S. application Ser. No. 12/925,462 filed on Oct. 21, 2010, the complete disclosure of which is herein incorporated by reference.

From the foregoing it is believed that those skilled in the pertinent art will recognize the meritorious advancement of this invention and will readily understand that while the present invention has been described in association with a few preferred embodiments thereof, and other embodiments, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim:

1. A method of making a cross-linked thermoplastic elastomer useful for forming a railway article, the method comprising the steps of: heating a dry mixture to a temperature within the range of 200° F. to 450° F. to create a heated partially cross-linked mixture, the dry mixture comprising a thermoplastic co-polyester base material, a di-isocyanate and a diamine; injecting the heated partially cross-linked mixture into at least one injection mold cavity; and curing the injected material, wherein prior to heating of the dry mixture, applying an adhesion promoter to said thermoplastic co-polyester base material by coating said thermoplastic co-polyester base material with a solvent carrier mixture containing the adhesion promoter, and drying the solvent carrier mixture applied to the thermoplastic co-polyester base material at a temperature to remove the solvent carrier.

2. The method of claim 1, wherein the diamine is selected from the group consisting of 4,4' methylene-bis-(3-chloro-2,6-diethylaniline), 4,4' methylene-bis-(2,6-diethylaniline), 4,4'-methylenebis(2-isopropyl-6-methylaniline), 4,4'-methylenebis(2,6-diisopropylaniline), 4,4'-methylenebis-(O-chloroaniline), methylene dianiline, diethyl 2,4-toluenediamine, dimethyl thio-toluene diamine and 4,4'-methylenebis (N-sec-butylaniline).

3. The method of claim 1, wherein the di-isocyanate comprises between 1 to 10% of the total weight of the mixture.

4. The method of claim 1, wherein the di-isocyanate is one of monomeric or polymeric nature.

5. The method of claim 1, wherein said diisocyanate is selected from the group consisting of: 4,4' diphenylmethane diisocyanate, toluene diisocyanates (TDI), toluene ortho diisocyanates (TODI), naphthalene diisocyanates (NDI), hydrogenated methylene diisocyanates (H12MIDI), isophorone diisocyanates (IPDI), hexamethylene diisocyanates (HDI), and 1,4 phenylene diisocyanates (PPDI).

6. The method of claim 1, wherein curing comprises curing the injected material at a temperature between 150° F. to 250° F.

7. The method of claim 1, wherein said diamine comprises a first diamine that is included together with said thermoplastic co-polyester base material and said di-isocyanate, the first diamine, said thermoplastic co-polyester base material and said di-isocyanate forming a first mixture, and wherein said diamine comprises a second diamine which is a diamine different than the diamine of said first mixture, said second diamine being added to said first mixture to form a molding composition, and wherein injecting comprises injecting said molding composition into said injection mold cavity; and curing the injected material to form an article.

8. The method of claim 7, wherein said first diamine includes a diamine selected from the group consisting of 4,4' methylene-bis-(3-chloro-2,6-diethylaniline), 4,4' methylene-bis-(2,6-diethylaniline), 4,4'-methylenebis(2-isopropyl-6-methylaniline), 4,4'-methylenebis(2,6-diisopropylaniline), 4,4'-methylenebis-(O-chloroaniline), methylene dianiline, and wherein said second diamine is a liquid diamine selected from the group consisting of diethyl toluene diamine, dimethyl thio-toluene diamine, 4,4'-methylenebis(N-sec-butylaniline).

9. The method of claim 1, wherein the method includes placing said dry mixture within a mixing barrel, and wherein the di-isocyanate comprises between 1 to 10% of the total weight of the mixture and wherein the di-isocyanate is one of monomeric or polymeric nature, wherein the diamine comprises between 1 to 10% of the total weight of the mixture and is selected from the group consisting of 4,4' methylene-bis-(3-chloro-2,6-diethylaniline), 4,4' methylene-bis-(2,6-diethylaniline), 4,4'-methylenebis(2-isopropyl-6-methylaniline), 4,4'-methylenebis(2,6-diisopropylaniline), 4,4'-methylenebis-(O-chloroaniline), methylene dianiline, diethyl 2,4-toluenediamine, dimethyl thio-toluene diamine and 4,4'-methylenebis(N-sec-butylaniline); and wherein curing comprises curing for a period of time between 2 and 36 hours.

10. The method of claim 9, wherein the diamine comprises a mixture of diamines selected from the group consisting of 4,4' methylene-bis-(3-chloro-2,6-diethylaniline), 4,4' methylene-bis-(2,6-diethylaniline), 4,4'-methylenebis(2-isopropyl-6-methylaniline), 4,4'-methylenebis(2,6-diisopropylaniline), 4,4'-methylenebis-(O-chloroaniline), methylene dianiline, diethyl 2,4-toluenediamine, dimethyl thio-toluene diamine and 4,4'-methylenebis(N-sec-butylaniline).

11. The method of claim 1, wherein the diisocyanate includes at least one monomeric diisocyanate, and wherein the method comprises mixing said thermoplastic co-polyester base material and said monomeric diisocyanate to create a first mixture, the monomeric diisocyanate comprising between 1% to 10% of the total mass of the first mixture; mixing said diamine compound selected from the group consisting of 4,4'methylene-bis-(3-chloro-2,6-diethylaniline), 4,4' methylene-bis-(2,6-diethylaniline), 4,4'-methylenebis(2-isopropyl-6-methylaniline), 4,4'-methylenebis(2,6-diisopropylaniline), 4,4'-methylenebis-(O-chloroaniline) and methylene dianiline with a compound selected from the group consisting of diethyl 2,4-toluenediamine and dimethyl thio-toluene diamine and 4,4'-methylenebis(N-sec-butylaniline) to create a second mixture, wherein heating comprises heating the first mixture to a temperature within the range of 200° F. to 450° F. to create a heated first mixture, and heating the second mixture to a temperature greater than the melting point of the second mixture and less than 225° F. to create a liquid second mixture having a volume;

wherein injecting comprises injecting the heated first mixture into a barrel of an injection molding machine through a first opening, and injecting the liquid second mixture into the barrel of the injection molding machine in a plurality of dispensing shots of approximately equal amounts of the volume of the liquid second mixture during a predetermined time period; and injecting a reaction product into said at least one injection mold cavity, the reaction product formed by the reaction of the heated first mixture and the liquid second mixture;

forming an article comprised of the reaction product.

12. The method of claim 1, wherein the diisocyanate includes at least one monomeric diisocyanate, and wherein the method comprises mixing said thermoplastic co-polyester base material and said monomeric diisocyanate to create a first mixture, the monomeric diisocyanate comprising between 1% to 10% of the total mass of the first mixture; selecting a diamine compound selected from the group consisting of 4,4'methylene-bis-(3-chloro-2,6-diethylaniline), 4,4' methylene-bis-(2,6-diethylaniline), 4,4'-methylenebis(2-isopropyl-6-methylaniline), 4,4'-methylenebis(2,6-diisopropylaniline), 4,4'-methylenebis-(O-chloroaniline), methylene dianiline, diethyl 2,4-toluenediamine, dimethyl thio-toluene diamine and 4,4'-methylenebis(N-sec-butylaniline) to be available for the process, wherein heating comprises heating the first mixture to a temperature within the range of 200° F. to 450° F. to create a heated first mixture, and heating the selected diamine to a temperature greater than the melting point of the diamine and less than 225° F. to create a liquid amine having a volume;

wherein injecting comprises injecting the heated first mixture into a barrel of an injection molding machine through a first opening, and injecting the liquid diamine into the barrel of the injection molding machine in a plurality of dispensing shots of approximately equal amounts of the volume of the liquid diamine during a predetermined time period; and injecting a reaction product into said at least one injection mold cavity, the reaction product formed by the reaction of the heated first mixture and the liquid diamine;

forming an article comprised of the reaction product.

13. The method of claim 11, wherein the first amine is 75% to 95% of the total mass of the second mixture and the second amine is 25% to 5% of the total mass of the second mixture.

14. The method of claim 1, wherein including injecting the heated first mixture comprising the heated partially cross-linked mixture into a barrel of an injection molding machine through a first opening; injecting a second liquid diamine selected from the group consisting of diethyl toluene diamine, dimethyl thio-toluene diamine, 4,4'-methylenebis(N-sec-butylaniline), into the barrel of the injection molding machine in a plurality of dispensing shots of approximately equal amounts of the volume of the liquid second diamine during a predetermined time period; injecting a reaction product into said at least one injection mold cavity, the reaction product formed by the reaction of the heated first mixture and the liquid second mixture; forming an article composed of the reaction product; and curing the injected material at a temperature between 150° F. to 250° F. for a period of time between 2 and 36 hours.

15. The method of claim 9, wherein the dry mixture comprises a first mixture of said thermoplastic co-polyester base material and said di-isocyanate comprising between 1 to 10% of the total weight of the first mixture, the di-isocyanate being one of monomeric or polymeric nature, and injecting the heated first mixture into a barrel of an injection molding machine through a first opening; injecting a liquid diamine, said liquid diamine comprising between 1 to 10% of the total weight of the mixture, and including a first compound being selected from said group consisting of 4,4' methylene-bis-(3-chloro-2,6-diethylaniline), 4,4' methylene-bis-(2,6-diethylaniline), 4,4'-methylenebis(2-isopropyl-6-methylaniline) and 4,4'-methylenebis(2,6-diisopropylaniline) and a second compound being selected from the group consisting of diethyl toluene diamine, dimethyl thio-toluene diamine and 4,4'-methylenebis(N-sec-butylaniline), into the barrel of the injection molding machine in a plurality of dispensing shots of approximately equal amounts of the volume of the liquid diamine during a predetermined time period; injecting a reaction product into said at least one injection mold cavity, the reaction product formed by the reaction of the heated first mixture and the liquid diamine; forming an article composed of the reaction product; and curing the injected material at a temperature between 150° F. to 250° F. for a period of time between 2 and 36 hours.

16. The method of claim 14, wherein said diamine comprises a first compound selected from the group consisting of 4,4' methylene-bis-(3-chloro-2,6-diethylaniline), 4,4' methylene-bis-(2,6-diethylaniline), 4,4'-methylenebis(2-isopropyl-6-methylaniline) and 4,4'-methylenebis(2,6-diisopropylaniline) which is 75% to 95% of the total mass of said diamine, and wherein said diamine comprises a second compound selected from the group consisting of diethyl toluene diamine, dimethyl thio-toluene diamine and 4,4'-methylenebis(N-sec-butylaniline) which is 25% to 5% of the total mass of said diamine.

17. The method of claim 1, wherein said adhesion promoter is a silane.

18. The method of claim 9, wherein said diisocyanate comprises between 1% to 3% of the total weight of the mixture forming the cross-linked thermoplastic co-polyester.

19. The method of claim 1, wherein the method comprises a of making a cross-linked thermoplastic elastomer useful for forming a railway article having a durometer having a hardness in the range of 70 A to 75 D durometer.

* * * * *